(12) United States Patent
Li et al.

(10) Patent No.: US 8,271,908 B2
(45) Date of Patent: Sep. 18, 2012

(54) TOUCH GESTURES FOR REMOTE CONTROL OPERATIONS

(75) Inventors: Yang Li, Palo Alto, CA (US); Hao Lu, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,055

(22) Filed: Sep. 30, 2011

(65) Prior Publication Data

US 2012/0216154 A1 Aug. 23, 2012

Related U.S. Application Data

(63) Continuation of application No. 13/033,295, filed on Feb. 23, 2011.

(51) Int. Cl.
*G06F 3/033* (2006.01)
*G06F 3/048* (2006.01)
(52) U.S. Cl. ......... 715/863; 715/702; 715/864; 345/173
(58) Field of Classification Search ................ 715/863, 715/702, 864; 345/173
See application file for complete search history.

(56) References Cited

U.S. PATENT DOCUMENTS

| | | | | |
|---|---|---|---|---|
| 5,726,669 A * | 3/1998 | Obata et al. | ..................... | 345/2.2 |
| 5,729,687 A * | 3/1998 | Rothrock et al. | ............. | 709/204 |
| 5,748,185 A * | 5/1998 | Stephan et al. | ................ | 345/173 |
| 5,781,662 A * | 7/1998 | Mori et al. | ..................... | 382/189 |
| 5,809,240 A * | 9/1998 | Kumagai | ...................... | 709/205 |
| 5,867,156 A * | 2/1999 | Beard et al. | .................... | 715/753 |
| 5,872,924 A * | 2/1999 | Nakayama et al. | ............ | 709/205 |
| 5,880,743 A * | 3/1999 | Moran et al. | .................. | 345/473 |
| 5,909,213 A * | 6/1999 | Martin | ............................ | 715/753 |
| 5,923,307 A * | 7/1999 | Hogle, IV | .......................... | 345/4 |
| 5,923,323 A * | 7/1999 | Chiu et al. | ..................... | 715/767 |
| 6,049,329 A * | 4/2000 | Zetts et al. | ..................... | 345/179 |
| 6,057,845 A * | 5/2000 | Dupouy | ......................... | 715/863 |
| 6,061,717 A * | 5/2000 | Carleton et al. | .............. | 709/205 |
| 6,167,433 A * | 12/2000 | Maples et al. | ................ | 709/204 |
| 6,476,834 B1 * | 11/2002 | Doval et al. | .................. | 715/863 |
| 6,545,669 B1 * | 4/2003 | Kinawi et al. | ................. | 345/173 |
| 6,668,081 B1 * | 12/2003 | Ilan et al. | ....................... | 382/187 |
| 6,842,795 B2 * | 1/2005 | Keller | ............................. | 710/15 |
| 6,956,562 B1 * | 10/2005 | O'Hara et al. | ................. | 345/173 |
| 6,992,702 B1 * | 1/2006 | Foote et al. | ................. | 348/211.8 |
| 7,004,394 B2 * | 2/2006 | Kim | ......................... | 235/472.01 |
| 7,202,861 B2 * | 4/2007 | Lynggaard | .................... | 345/179 |

(Continued)

OTHER PUBLICATIONS

"CrossY—A crossing-based drawing application" [online]. University of Maryland and Human-Computer Interaction Lab (HCIL). Last updated on May 19, 2006. Retrieved from the Internet: <URL:http://www.cs.umd.edu/hcil/crossy>, 2 pp.

(Continued)

*Primary Examiner* — Steven B Theriault
(74) *Attorney, Agent, or Firm* — Shumaker & Sieffert, P.A.

(57) ABSTRACT

In general, this disclosure describes techniques for providing a user of a first computing device (e.g., a mobile device) with the ability to utilize the first computing device to control a second computing device (e.g., a television). Specifically, the techniques of this disclosure may, in some examples, allow the user to use drawing gestures on a mobile computing device to remotely control and operate the second computing device. Using a presence-sensitive user interface device (e.g., a touch screen), the user may use drawing gestures to indicate characters associated with operations and commands to control the second computing device.

12 Claims, 8 Drawing Sheets

U.S. PATENT DOCUMENTS

| | | | | |
|---|---|---|---|---|
| 7,277,726 | B2 | 10/2007 | Ahya et al. | |
| 7,289,110 | B2* | 10/2007 | Hansson | 345/173 |
| 7,353,453 | B1* | 4/2008 | Simmons | 715/268 |
| 7,532,196 | B2* | 5/2009 | Hinckley | 345/156 |
| 7,533,189 | B2* | 5/2009 | Mahajan et al. | 709/248 |
| 7,536,034 | B2* | 5/2009 | Rhoads et al. | 382/107 |
| 7,536,656 | B2* | 5/2009 | Hullender et al. | 715/863 |
| 7,557,774 | B2* | 7/2009 | Baudisch et al. | 345/1.1 |
| 7,567,233 | B2* | 7/2009 | Garibaldi et al. | 345/157 |
| 7,614,019 | B2* | 11/2009 | Rimas Ribikauskas et al. | 715/863 |
| 7,636,794 | B2* | 12/2009 | Ramos et al. | 709/248 |
| 7,643,006 | B2* | 1/2010 | Hill et al. | 345/156 |
| 7,698,660 | B2* | 4/2010 | Sanchez et al. | 715/863 |
| 7,702,130 | B2 | 4/2010 | Lm et al. | |
| 7,724,242 | B2* | 5/2010 | Hillis et al. | 345/173 |
| 7,750,891 | B2 | 7/2010 | Stephanick et al. | |
| 7,817,991 | B2* | 10/2010 | Hinckley et al. | 455/416 |
| 7,818,177 | B1* | 10/2010 | Bangalore et al. | 704/270 |
| 7,821,503 | B2 | 10/2010 | Stephanick et al. | |
| 7,831,933 | B2* | 11/2010 | Marggraff et al. | 715/863 |
| 7,844,914 | B2 | 11/2010 | Andre et al. | |
| 7,854,429 | B2* | 12/2010 | Abe | 271/276 |
| 8,060,841 | B2* | 11/2011 | Boillot et al. | 715/863 |
| 8,131,080 | B2* | 3/2012 | Tonouchi | 382/186 |
| 2002/0116205 | A1* | 8/2002 | Ankireddipally et al. | 705/1 |
| 2003/0014615 | A1* | 1/2003 | Lynggaard | 712/220 |
| 2004/0145574 | A1* | 7/2004 | Xin et al. | 345/173 |
| 2004/0240739 | A1* | 12/2004 | Chang et al. | 382/186 |
| 2004/0259537 | A1 | 12/2004 | Ackley | |
| 2005/0022130 | A1* | 1/2005 | Fabritius | 715/739 |
| 2005/0093868 | A1* | 5/2005 | Hinckley | 345/502 |
| 2005/0165795 | A1* | 7/2005 | Myka et al. | 707/100 |
| 2005/0275638 | A1* | 12/2005 | Kolmykov-Zotov et al. | 345/179 |
| 2006/0004834 | A1* | 1/2006 | Pyhalammi et al. | 707/102 |
| 2007/0050054 | A1 | 3/2007 | Sambandam Guruparan et al. | |
| 2007/0098263 | A1* | 5/2007 | Furukawa et al. | 382/181 |
| 2008/0065722 | A1 | 3/2008 | Brodersen et al. | |
| 2008/0235621 | A1* | 9/2008 | Boillot | 715/810 |
| 2008/0240568 | A1* | 10/2008 | Tonouchi | 382/186 |
| 2008/0250012 | A1* | 10/2008 | Hinckley et al. | 707/5 |
| 2009/0286572 | A1* | 11/2009 | Rhoads et al. | 455/557 |
| 2010/0261466 | A1* | 10/2010 | Chang et al. | 455/420 |
| 2010/0262905 | A1* | 10/2010 | Li | 715/702 |
| 2010/0293462 | A1* | 11/2010 | Bull et al. | 715/716 |
| 2011/0038552 | A1* | 2/2011 | Lam | 382/232 |
| 2011/0239114 | A1* | 9/2011 | Falkenburg et al. | 715/702 |
| 2011/0246891 | A1* | 10/2011 | Schubert et al. | 715/719 |
| 2011/0249024 | A1* | 10/2011 | Arrasvuori et al. | 345/629 |

OTHER PUBLICATIONS

"ShaperWriter" [online]. ShapeWriter, Inc., 2009. Retrieved from the Internet: <URL:http://shapewriter.com/>, 2 pp.

"anyRemote" [online]. SOURCEFORGE.NET. Maintained by anyRemote. First published on Jun. 20, 2006. Retrieved from the Internet: <http://anyremote.sourceforge.net/>, 2 pp.

U.S. Appl. No. 13/244,105, by Yang Li, filed Sep. 30, 2011, 37 pp.

International Search Report and Written Opinion of international application No. PCT/US2012/025093, dated Jun. 26, 2012, 12 pp.

* cited by examiner

TOUCH GESTURES FOR REMOTE CONTROL OPERATIONS

This application is a continuation of U.S. Application No. 13/033,295 filed Feb. 23, 2011, which is hereby incorporated by reference in its entirety.

TECHNICAL FIELD

This disclosure relates to a gesture-based user interface for mobile devices.

BACKGROUND

Computing devices are continuously improving and becoming more commonly used. Additionally, touch-based interaction with touch screens of computing devices is also becoming a more common and major interaction modality for mobile device user interfaces. Touch-based interaction may be, for example, finger-based touch input.

Furthermore, computing devices are being used more to interact with other devices and perform operations other than simple tasks traditionally associated with computing devices. In some instances, computing devices may be used to remotely control operations of other devices.

SUMMARY

In general, this disclosure describes techniques for providing a user of a computing device with the ability to utilize a first computing device to control a second computing device. Specifically, the techniques of this disclosure may, in some examples, allow the user to use drawing gestures on a mobile computing device to remotely control and operate another device. Using a presence-sensitive user interface device (e.g., a touch screen), the user may use drawing gestures to indicate characters associated with operations and commands to control the second computing device.

In one example, the disclosure is directed to a method receiving, via a presence-sensitive user interface device of a first device, a first user input comprising a first drawing gesture, transmitting, by the first device, first data representing the first drawing gesture to a second device wirelessly coupled to the first device, wherein the second device includes a display displaying one or more selectable elements, and wherein at least one of the selectable elements is graphically-highlighted on the display based upon the first data, receiving, via the presence-sensitive user interface device of the first device, a second user input comprising a selection gesture, and transmitting, by the first device, second data representing the selection gesture, wherein the at least one graphically-highlighted element is selected in response to the second data.

In another example, the disclosure is direction to a computer-readable storage medium encoded with instructions that, when executed, cause one or more processors at a first device to perform operations comprising receiving, via a presence-sensitive user interface device of the first device, a first user input comprising a first drawing gesture, transmitting, by the first device, first data representing the first drawing gesture to a second device wirelessly coupled to the first device, wherein the second device includes a display displaying one or more selectable elements, and wherein at least one of the selectable elements is graphically-highlighted on the display based upon the first data, receiving, via the presence-sensitive user interface device of the first device, a second user input comprising a selection gesture, and transmitting, by the first device, data representing the selection gesture, wherein the at least one graphically-highlighted elements is selected in response to the second data.

In another example, the disclosure is directed to a first device comprising one or more processors, a presence-sensitive user interface device, a gesture module operable by the one or more processors to receive, via the presence-sensitive user interface device, a first user input comprising a first drawing gesture, means for transmitting first data representing the first drawing gesture to a second device wirelessly coupled to the first device, wherein the second device includes a display displaying one or more selectable elements, and wherein at least one of the selectable elements is graphically-highlighted on the display based upon the first data, and a user interface controller operable by the one or more processors to receive, via the presence-sensitive user interface device, a second user input comprising a selection gesture, wherein the means for transmitting transmits data representing the selection gesture, and wherein the at least one graphically-highlighted elements is selected in response to the second data.

In another example, the disclosure is directed to a system comprising a first device comprising a presence-sensitive user interface device that receives a first user input comprising a first drawing gesture and means for transmitting data, and a second device coupled to the first device, the second device comprising a display that displays one or more selectable elements, wherein the means for transmitting data transmits first data representing the first drawing gesture to the second device, wherein at least one of the selectable elements is graphically-highlighted on the display based upon the first data, wherein the presence-sensitive user interface device receives a second user input comprising a selection gesture, wherein the means for transmitting transmits data representing the selection gesture, and wherein the at least one graphically-highlighted elements is selected in response to the second data.

Certain techniques of the present disclosure may, as one non-limiting example, allow a user of a computing device to perform certain remote operations using drawing gestures on a touch screen of the computing device. The user may enter different patterns using the gestures on the touch screen, to indicate a desired operation, resulting in remotely controlling another device.

The details of one or more implementations of the disclosure are set forth in the accompanying drawings and the description below. Other features, objects, and advantages of the disclosure will be apparent from the description and drawings, and from the claims.

DETAILED DESCRIPTION

In general, this disclosure describes techniques for providing a user the ability to remotely control operation of a device (e.g., television, projector display, computer, or the like) using gestures (e.g., using a presence-sensitive user interface device, such as a touch user interface) on a computing device. These techniques may allow the user to use gestures on a first computing device to select items on the second computing device via interactions with a touch screen of the computing device. These techniques may be integrated with existing systems that allow the user to draw gestures on the touch screen, where the gestures may be associated with characters corresponding to items displayed on the second computing device. Using the touch screen, the user may draw gestures anywhere on the screen to interact with the second computing device, regardless of what the second computing device is or what is displayed on the second computing device. In this manner, the user is not limited to a predefined keypad corresponding to a specific second computing device, and can interact with a variety of computing devices using the same user interface. Additionally, the user may operate the second computing device without having to look at the computing device, as long as the user draws the gesture somewhere within the user interface, which is in some examples the entire screen of the computing device.

In one example, at least a portion of the touch screen of the computing device may be allocated for drawing gestures. Using the allocated portion, the user may utilize gestures to draw characters corresponding to items displayed on the second computing device. In one example, the items may be menu items, and the characters that the user draws may correspond to a first letter of one or more of the items or a shape associated with the item. The one or more items corresponding to the drawn character may be highlighted, and the user may utilize the same technique to define more characters, until the desired item is selected. The user may then utilize the computing device to select the item (e.g., selectable menu item) or operate the item (e.g., a control item). As the user draws gestures on the computing device, a representation of the drawn gesture may be displayed on the computing device and/or the display of the second computing device. The user may also utilize gestures on the computing device to delete the last character or the sequence of characters.

Some computing devices provide user interfaces that allow the user to utilize the first computing device as a remote control for a second computing device. Often, the user interface displays a keypad that resembles a remote control. Additionally, the user interface may display a remote control keypad specific for the second computing device. For example, the remote control keypad may be an application that the user needs to acquire for a specific second computing device, and therefore, if the user wishes to use the first computing device to remotely control a second computing device, a different remote control keypad would need to be acquired, as different computing devices are associated with different keypads. Furthermore, some computing devices may require keypads with a lot of keys to enable different functionalities. However, with the size limitations of computing devices, a remote control keypad may have keys that are too small to easily navigate and select. This can become frustrating and cumbersome for a user.

The techniques of this disclosure allow a user to use a first computing device (e.g., mobile phone) to control a second computing device (e.g., a Google television device, television, projector, or the like), by drawing gestures on a presence-sensitive user interface device (e.g., a touch screen) of the first computing device. Rather than utilizing a keypad resembling a remote control for controlling the second computing device, the techniques allow the user to draw gestures on at least a portion of the touch screen of the computing device to indicate a desired operation. The gestures may be translated into operations by associating a character represented by the drawn gesture with one or more items that appear on the second computing device.

Figure 1:
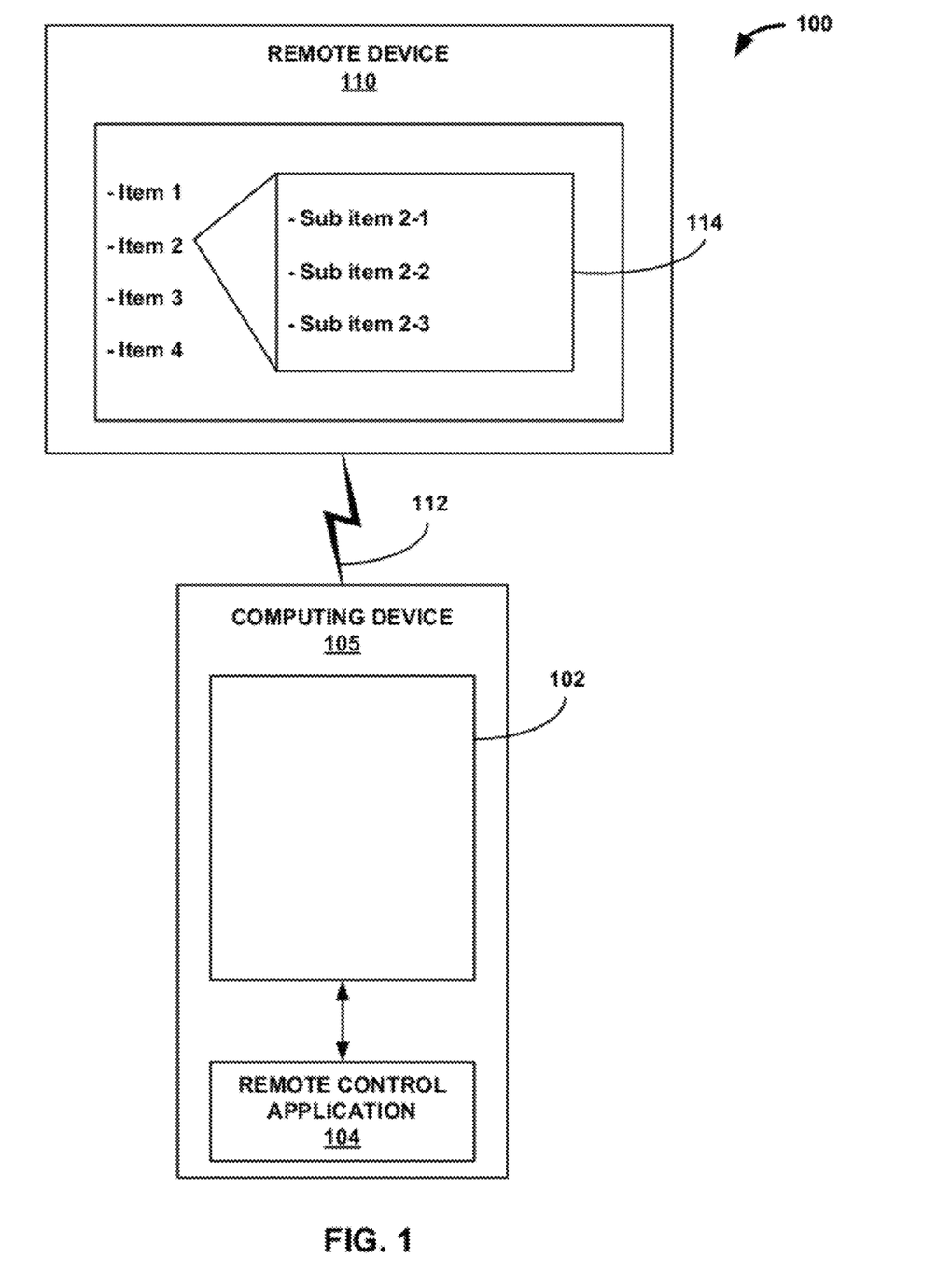
FIG. 1 is a block diagram illustrating an example system in accordance with techniques of the present disclosure.

FIG. 1 is a block diagram illustrating an example system 100 in accordance with techniques of the present disclosure. In the example of FIG. 1, system 100 includes first computing device 105 and second computing device 110. Using techniques of this disclosure, first computing device 105 may be used as a remote control device of second computing device 110. In other examples, system 100 may include one or more computing devices 105 and/or one or more computing devices 110. Devices in system 100 may interact with one another over a communication link such as, for example, connection 112, when properly configured. In one example, first computing device 105 and second computing device 110 may include Wi-Fi or Bluetooth capabilities and may be configured to communicate wirelessly over a connection 112.

In some examples, first computing device 105 may comprise a mobile device. For example, first computing device 105 may comprise or be part of a wireless communication device (e.g., wireless mobile handset or device), a video telephone, a digital multimedia player, a personal digital assistant (PDA), a video game console, a laptop computer, a tablet computer, or other devices. In some examples, first computing device 105 may communicate with external, distinct devices via one or more networks (not shown), such as one or more wired or wireless networks, which may, in some cases, provide access to the Internet. First computing device 105 may communicate with one or more second computing devices 110 such as, for example, a standalone smart television, or a set-top box connected to a television set.

As shown in the example of FIG. 1, first computing device 105 may include user interface 102. At least a portion of user interface 102 may be a presence-sensitive user interface device. The presence-sensitive user interface device may be, for example, a touch screen of first computing device 105, responsive to tactile input via a user's finger or a stylus pen, for example. First computing device 105 may execute applications such as, for example, remote control application 104 that enables a user of first computing device 105 to interact with and control operations of second computing device 110. During execution, user interaction with remote control application 104 may result in controlling operations associated with second computing device 110.

In one example, the user may initiate connection between first computing device 105 and second computing device 110 by establishing communication over connection 112. When remote control application 104 is initially launched, it may prompt the user with a list of second computing devices 110 with which first computing device 105 may communicate and control using remote control application 104. The user may select the second computing device he/she wishes to connect to and control using computing device 105. When the connection is established between first computing device 105 and second computing device 110, second computing device 110 is added to the list of devices that a user can control using remote control application 104.

Once a connection is established between first computing device 105 and second computing device 110, the user may configure remote control application 104 on first computing device 105 such that input provided by the user into remote control application 104 controls operation associated with second computing device 110. In one example, remote control application 104 on first computing device 105 may be configured to control one or more second computing devices 110. In one example, when remote control application 104 is running on first computing device 105, a list of associated second computing devices 110 may be presented to the user to select the desired second computing device to control. In another example, when remote control application 104 is running on first computing device 105, the second computing device 110 that is closest to first computing device 105 may be automatically launched. In one example, the user may utilize gestures to switch among second computing devices 110, while remote control application 104 is running.

In one example, remote control application 104 may be operable on first computing device 105 to perform, during execution, functions in accordance with the techniques of this disclosure. For example, remote control application 104 may interact and/or exchange data with a device that is external to first computing device 105, such as second computing device 110. First computing device 105 may, in various examples, download or otherwise obtain remote control application 104 from an external server via one or more networks (not shown). For example, a web browser hosted by first computing device 105 may download one or more applications, such as remote control application 104, upon access of one or more web sites hosted by such as external server (e.g., web server).

During execution, remote control application 104 may implement, invoke, execute, or otherwise utilize user interface 102 as a mechanism to obtain user input. For example, during an initial interaction, remote control application 104 may prompt the user via user interface 102 to provide set-up information associated with the user and any second computing devices 110 that the user wishes to interact with using remote control application 104. In another example, during execution, remote control application 104 may present to the user, via user interface 102, a list of one or more second computing devices 110 from which the user may select a second computing device that he/she wishes to interact with. Remote application 104 may then invoke user interface 102 in gesture-based mode such that a user may draw gestures in user interface 102 to indicate remote control operations that he/she wishes to utilize to control operation of second computing device 110.

User interface 102 may, during execution of remote control application 104, provide the user with at least one portion that is presence-sensitive and with which the user may interact via touch (e.g., by finger or a stylus pen) to draw gestures corresponding to items on second computing device 110. A representation of the drawn gestures may be displayed on user interface 102 as the user draws the gestures. Remote control application 104 may include gesture-recognition capabilities, which may be capable of recognizing a drawn gesture and translating it into a matching character, e.g., a letter. As the user draws gestures on the portion of user interface 102 dedicated for gesture input, remote control application 104 may establish communication, via connection 112, with second computing device 110 and transfer information regarding the drawn gesture to second computing device 110. In one example, first computing device 105 may execute an algorithm that performs the gesture recognition to determine the corresponding character, and sends the drawn gesture and corresponding character to second computing device 110. In another example, first computing device 105 may send the drawn gesture to second computing device 110, and second computing device 110 may execute an algorithm that performs the gesture recognition to determine the corresponding character. In this example, second computing device 110 may comprises one or more processors operable to execute an algorithm to perform gesture recognition, which may be stored on a memory and/or storage of second computing device 110.

The character corresponding to the drawn gesture may be associated with an item displayed on a display of second computing device 110. An indication may be displayed on second computing device 110 to indicate the associated item. In one example, the associated item may be highlighted by displaying a box around the item, or displaying the item in a different color or using a different pattern, or the like. The user may then utilize a gesture (e.g., touching user interface 102) to indicate desire to select the highlighted item. In one example, selecting the highlighted item may result in displaying further items as FIG. 1 illustrates, if the selected item (e.g., item 2 in FIG. 1) has sub-items 114. The user may then utilize the same techniques described above to select one of the sub-items from sub-items 114. In another example, selecting the highlighted item may result in executing an action associated with the item (e.g., changing a channel, recording a program, or launching a website).

In one example, more than one item displayed on second computing device 110 may be associated with the character. For example, the drawn gesture may correspond to the letter A, and two or more items displayed on second computing device 110 may begin with the letter A. In this example, the one of the items listed first (e.g., closer to the top of the list) may be highlighted. The user may decide that the highlighted item is not the one he/she wished to interact with, and may utilize first computing device 105 to draw a gesture associated with the second letter of the desired item. In the same manner as described above, a character corresponding to the drawn gesture may be transferred to second computing device 110, and one of the items associated with the first character may be selected based on association with the second character, and highlighted for user selection, as noted above.

In one example, the user may utilize other gestures for editing purposes. For example, if the user draws a gesture that is erroneous or results in highlighting the wrong item, the user may make a swiping motion across user interface 102 to delete the last character corresponding to the last drawn gesture (e.g., by swiping horizontally leftward on the screen) or to delete the sequence of characters corresponding to the drawn gestures (e.g., by swiping horizontally rightward on the screen). When the user deletes a character or a sequence of characters, the highlighted item on the screen changes accordingly. For example, if the user deletes a character in a sequence of characters, the item corresponding to the remaining characters may be highlighted. In another example, if the user deletes the entire sequence of characters, resulting in none of the items being highlighted.

In one example, as noted above, the user may define certain operations and delete characters corresponding to drawn gestures using gestures on the screen. For example, to delete the character corresponding to the last drawn gesture, the user may swipe horizontally leftward across user interface 102. In another example, to delete the sequence of characters corresponding to a sequence of drawn gestures, the user may swipe horizontally rightward across user interface 102. As noted above, the user may select a highlighted item by tapping on user interface 102. Other gestures on user interface 102 may be also utilized to perform other operations such as, for example, moving the highlight box from one item to another by swiping vertically upward or downward on user interface 102.

In another example, the user may define certain operations and delete characters corresponding to drawn gestures using motion gestures, i.e., by moving computing device 105 in certain directions. For example, to delete the character corresponding to the last drawn gesture, the user may move computing device 105 horizontally leftward, and to delete a sequence of characters, the user may move computing device 105 horizontally rightward. In this example, the user may move computing device 105 vertically upward or downward to move the highlight box from one item to another.

Figure 2:
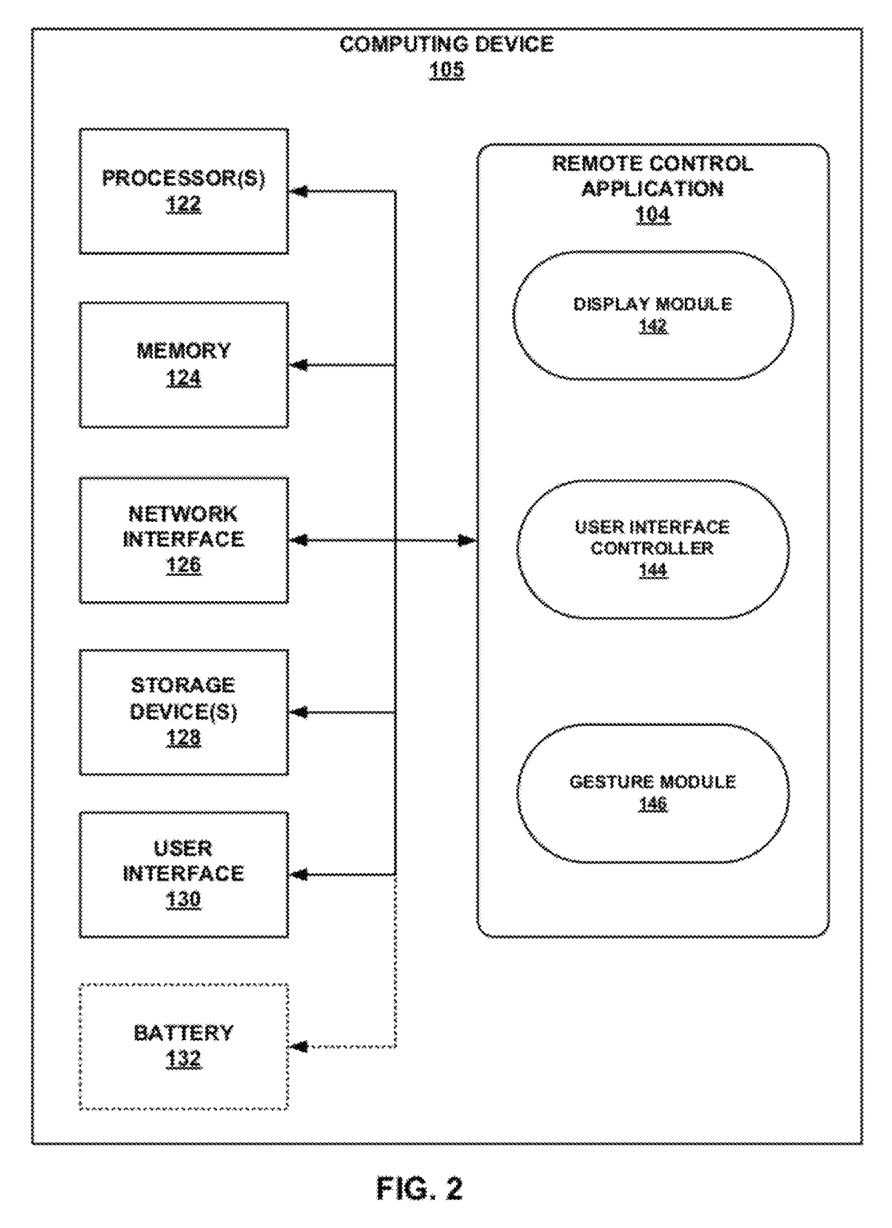
FIG. 2 is a block diagram illustrating further details of one example of the first computing device shown in FIG. 1.

FIG. 2 is a block diagram illustrating further details of computing device 105 shown in FIG. 1. FIG. 2 illustrates only one particular example of computing device 105, and many other example embodiments of computing device 105 may be used in other instances. As shown in the example of FIG. 2, computing device 105 includes one or more processors 122, memory 124, a network interface 126, one or more storage devices 128, user interface 130, and an optional battery 132. For example, if computing device 105 comprises a mobile device, computing device 105 may include battery 132. Each of components 122, 124, 126, 128, 130, and 132 may be interconnected via one or more busses for inter-component communications. Processors 122 may be configured to implement functionality and/or process instructions for execution within computing device 105. Processors 122 may be capable of processing instructions stored in memory 124 or instructions stored on storage devices 128.

User interface 130 may include, for example, a monitor or other display device for presentation of visual information to a user of computing device 105. User interface 130 may further include one or more input devices to enable a user to input data, such as a manual keyboard, mouse, touchpad, trackpad, etc. In some examples, user interface 130 may comprise a presence-sensitive user interface device such as, for example, a touch screen, which may be used both to receive and process user input and also to display output information. User interface 130 may further include printers or other devices to output information. In various instances in the description contained herein, references made to user interface 130 may refer to portions of user interface 130 (e.g., touch screen) that provide user input functionality. In one example, user interface 130 may be a touch screen that is responsive to tactile input by the user (e.g., by user's finger or stylus pen).

Memory 124 may be configured to store information within computing device 105 during operation. Memory 124 may, in some examples, be described as a computer-readable storage medium. In some examples, memory 124 is a temporary memory, meaning that a primary purpose of memory 124 is not long-term storage. Memory 124 may also be described as a volatile memory, meaning that memory 124 does not maintain stored contents when the computer is turned off. Examples of volatile memories include random access memories (RAM), dynamic random access memories (DRAM), static random access memories (SRAM), and other forms of volatile memories known in the art. In some examples, memory 124 may be used to store program instructions for execution by processors 122. Memory 124 may be used by software or applications running on computing device 105 (e.g., remote application 104 shown in FIG. 1) to temporarily store information during program execution.

Storage devices 128 may also include one or more computer-readable storage media. Storage devices 128 may be configured to store larger amounts of information than memory 124. Storage devices 128 may further be configured for long-term storage of information. In some examples, storage devices 128 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 105 also includes network interface 126. Computing device 105 may utilize network interface 126 to communicate with external devices (e.g., one or more servers, web servers, second computing device 110) via one or more networks, such as one or more wireless/wired networks. Computing device 105 may utilize network interface 126 in response to execution of one or more applications that require transferring data to and/or from other devices (e.g., other computing devices, servers, or the like). Computing device 105 may include Wi-Fi or Bluetooth capabilities, for example, which may be configurable to establish communication with second computing device 110 (FIG. 1) through network interface 126.

Any applications implemented within or executed by computing device 105 (e.g., remote control application 104 shown in FIG. 1) may be implemented or contained within, operable by, executed by, and/or be operatively coupled to processors 122, memory 124, network interface 126, storage devices 128, and/or user interface 130.

In one example, computing device 105 may include remote control application 104, which allows a user to input gestures on computing device 105 to control operations on a second computing device 110. Remote control application 104 may include a display module 142, a user interface controller 144, and a gesture module 146. Remote control application 104 may provide or display user interface 102 on which a user may provide tactile input to operate second computing device 110. Remote control application 104 may be stored in memory 124 and/or storage devices 130, and may be operable by processors 122 to perform various tasks during execution.

In one example, during implementation or execution of remote control application 104, display module 142 may be operable by processors 122 to define at least a portion of user interface 130 to receive gestures via tactile user input. User interface controller 144 may be operable by processors 122 to receive, via user interface 130, user input specifying gestures drawn intended to define operations to control second computing device 110. The user input may comprise contact with user interface 130 (e.g., contact with a touch screen) to draw gestures, where each of the gestures corresponds to an operation associated with a second computing device 110.

Gesture module 146 may be operable by processor 122 to determine, based on gestures the user draws on user interface 130, the appropriate matching characters and operations, which may be subsequently associated with the appropriate operations or items on second computing device 110. In one example, display module 142 may define at least a portion of user interface 130 for gesture input. In one example, gesture module 146 may display the drawn gestures on user interface 130 and determine the corresponding character. In another example, gesture module 146 may send the drawn gestures for display on second computing device 110.

In some examples, gesture module 146 may also determine, based on the direction a user moves computing device 105, operations corresponding to the motions. The operations may result in deleting characters previously defined by user's drawn gestures. In one example, the deleting operations may be defined using drawn gestures, instead of motions, on user interface 130. Whether gesture module 146 interprets motion gestures in addition to drawn gestures may be based on user selection indicating user's wish to utilize motion gestures, or may be a default setting of remote control application 104. In examples where motion gestures are utilized, computing device 105 may also include components capable of detecting motions and changes in position of computing device 105, e.g., accelerometer, compass, or the like.

Remote control application 104 may define at least a portion on user interface 130 where a user may use gestures to draw characters associated with operations on second computing device 110. The characters may correspond to letters or shapes associated with items and operations of second computing device 110. Additionally, using certain drawn gestures or motions, the user may be able to apply operations to the already-entered characters, e.g., delete one or more characters.

In one example, as the user utilizes gestures to draw characters and operations, gesture module 146 may determine the matching desired characters and operations. Display module 142 may be operable to receive the data regarding the drawn gestures to display on user interface 130. In this manner, display module 142 may be operable to display the gestures as the user draws them on user interface 130. In some examples, gesture module 146 may transfer data regarding the drawn gestures to second computing device 110, which may display the drawn gestures. Second computing device 110 may then determine based on the data regarding the drawn gestures, the corresponding characters or operations. In one example, gesture module 146 may also transfer data regarding the characters or operations corresponding to the drawn gestures to second computing device 110.

Processor 122 may be operable to execute one or more algorithms including, for example, a gesture-interpretation algorithm. In one example, the gesture-interpretation algorithm may determine the characters and operations corresponding to the drawn gestures. In some examples, the algorithm may associate the characters and operations corresponding to drawn gestures with items and operations of second computing device 110. In other examples, the algorithm may cause the characters and operations corresponding to the drawn gestures to be transferred to second computing device 110, where the characters and operations may be associated with items and operations on second computing device 110.

Figure 3A:
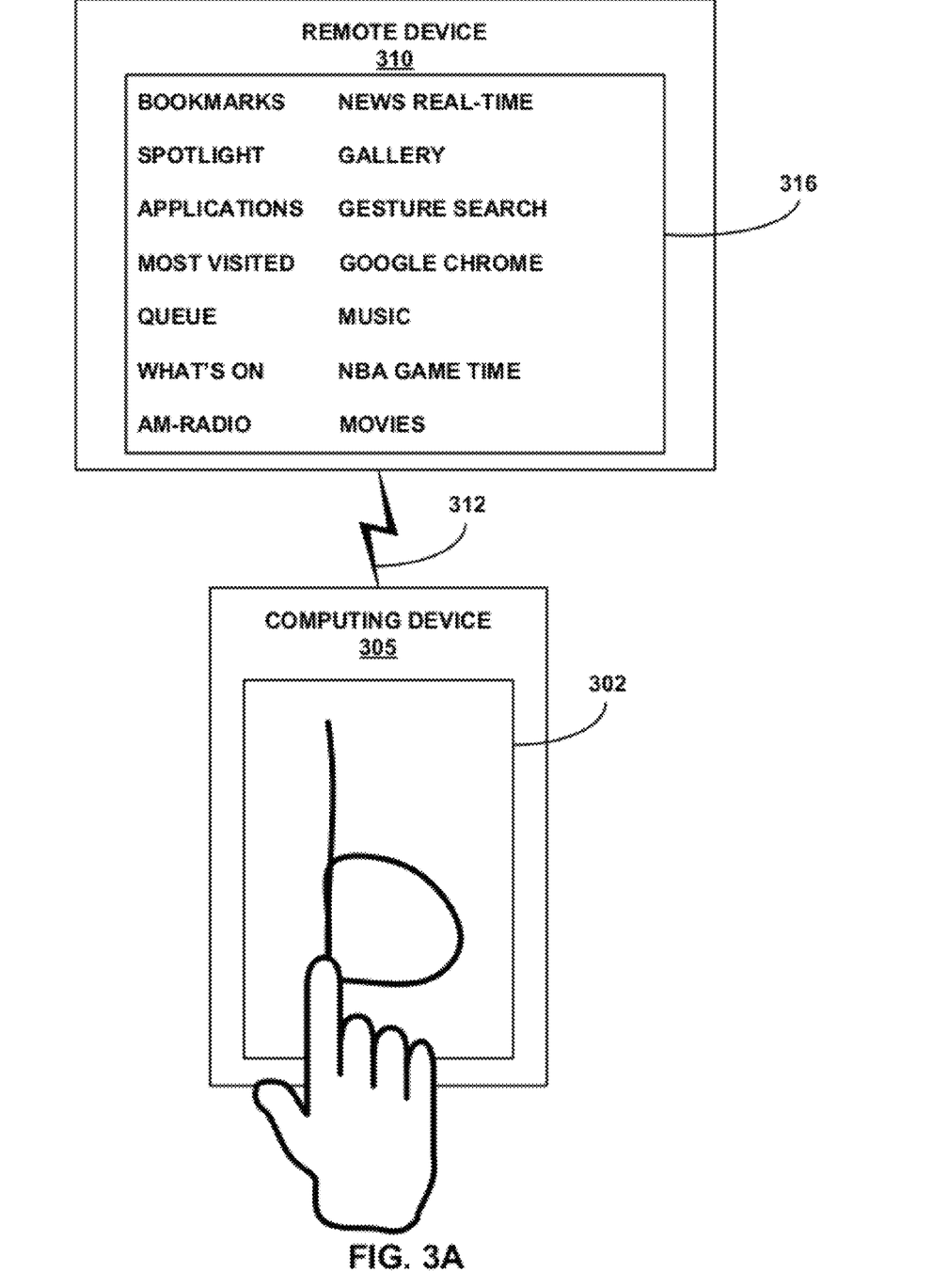
FIGS. 3A and 3B are block diagrams illustrating example screen displays of a first computing device as a user interacts with the first computing device to remotely control a second computing device, in accordance with one or more aspects of the present disclosure.
Figure 3B:
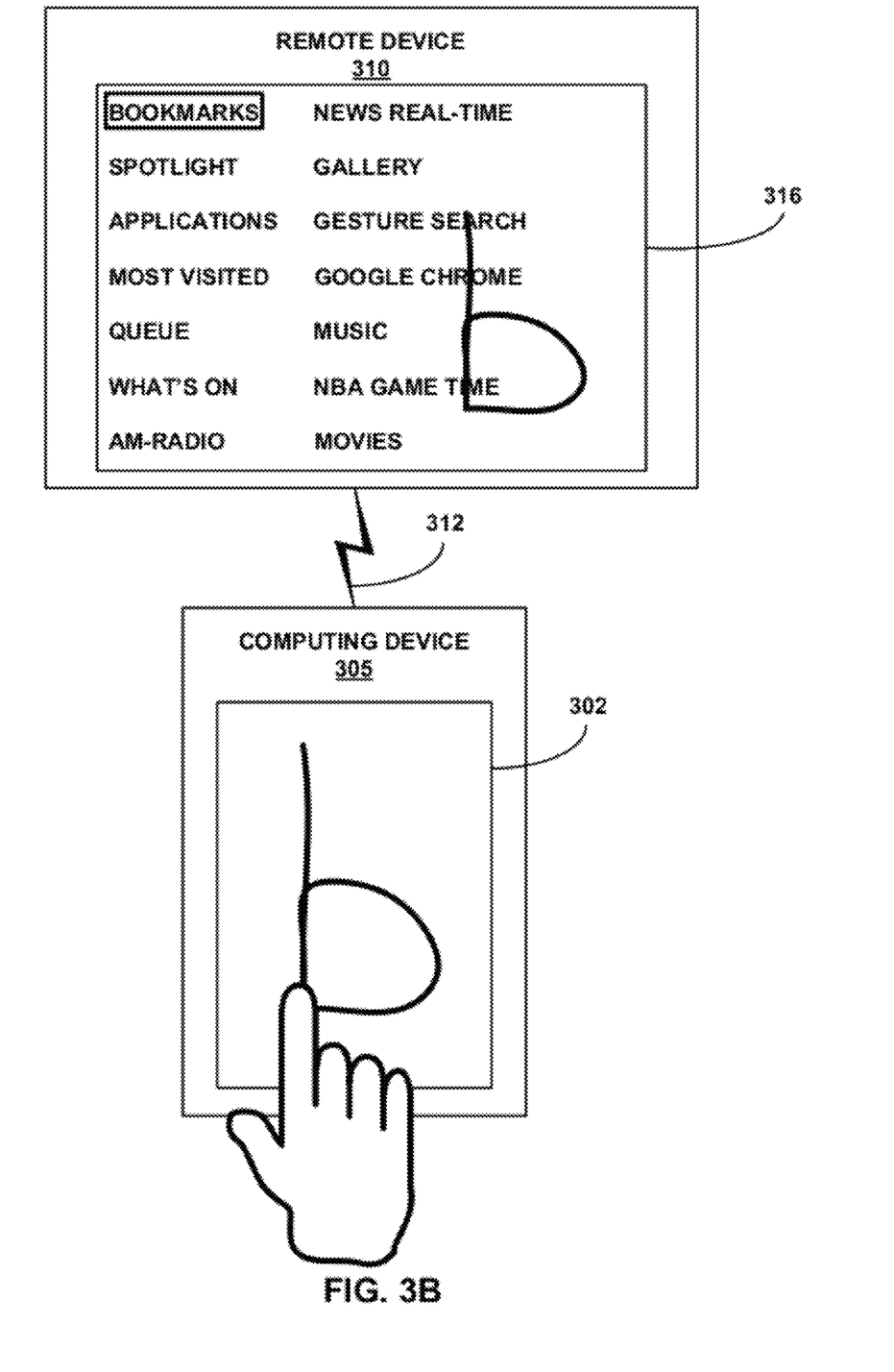

FIGS. 3A and 3B are block diagrams illustrating example screen displays of a first computing device as a user interacts with the computing device to remotely control a second computing device, in accordance with one or more aspects of the present disclosure. First computing device 305 may operate in the same manner as first computing device 105 of FIGS. 1 and 2, and second computing device 310 may operate in the same manner as second computing device 110 of FIG. 1. First computing device 305 may include a presence-sensitive user interface device such as, for example, user interface 302 (e.g., a touch screen).

As FIG. 3A illustrates, first computing device 305 may communicate wirelessly with second computing device 310 via connection 312 utilizing one of the many available wireless technologies, e.g., Wi-Fi, Bluetooth, or the like. Second computing device 310 may list target elements, which may be associated with different operations or functionalities on display device 316 associated with second computing device 310. In one example, target elements displayed on display device 316 of second computing device 310 may be textual objects, as FIG. 3A illustrates, and may be indexed according to their name, e.g., bookmarks, spotlights, applications, etc. Target elements may also be, for example, graphical objects, e.g., slider, progress bar, volume knob, and the like, and may be indexed using keywords corresponding to the graphical objects, e.g., slider, bar, volume, knob, and so forth. In the example of FIG. 3A, the user may utilize first computing device 305 to draw a gesture associated with a target elements the user wishes to select. In this example, the user may draw a gesture indicating the letter "B." As the user draws the gesture on user interface 302 of first computing device 305, a representation of the drawn gesture may be displayed on the user interface as FIG. 3A shows.

As FIG. 3B illustrates, when the user draws the gesture for the letter "B," data associated with the drawn gesture may be sent to second computing device 310. In one example, first computing device 305 may interpret the drawn gesture to determine the corresponding character. In this example, the data associated with the drawn gesture may include data regarding the drawn gesture and the corresponding character. In another example, first computing device 305 may send data regarding the drawn gesture to second computing device 310, which may in turn determine the corresponding character. second computing device 310 may display a representation of the drawn gesture on display device 316. Additionally, second computing device 310 may associate the corresponding character with the target elements displayed on display device 316.

In another example, second computing device 310 may communicate data associated with the target elements displayed on display device 316. In this example, first computing device 305 may interpret the drawn gesture to determine the corresponding character, and associate the corresponding character with the target element based on the communicated data from second computing device 310. First computing device 305 may display an indication of the associated target element to the user and request confirmation. Upon confirmation, first computing device 310 may communicate data indicating selection of the associated target element to second computing device 305. Second computing device 305 may then proceed with the appropriate action associated with selection of the indicated target element.

In one example, second computing device 310 may associate a character with the first indexed element that starts with the same character as the character corresponding to the drawn gesture. In this example, the first indexed target element is "Bookmarks" and may therefore be associated with the character "B" corresponding to the gesture the user drew on user interface 302 of first computing device 305. Second computing device 310 may highlight the associated target element by displaying a box around the item (as illustrated in FIG. 3B), or displaying the item in a different color or using a different pattern, or the like.

If the user wishes to select the highlighted target element, the user may provide a gesture on first computing device 305 to indicate the desire to activate the highlighted target element. For example, the user may tap on user interface 302 of first computing device 305 to activate "Bookmarks." In one example, activating a highlighted target element may result in different actions depending on the highlighted element and an operation associated with it. For example, activating the "Bookmarks" element may result in displaying another screen on display device 316 listing bookmarks associated with second computing device 310. The bookmarks may be listed and indexed and the user may select one of the bookmarks as described above with respect to selecting one of the target elements. In another example, activating a highlighted target element may result in launching a website or a screen associated with the highlighted target element. In another example, activating a highlighted target element may result in performing an operation associated with the highlighted target element, e.g., increase/decrease volume, change display settings, fast forward, and the like.

Figure 4A:
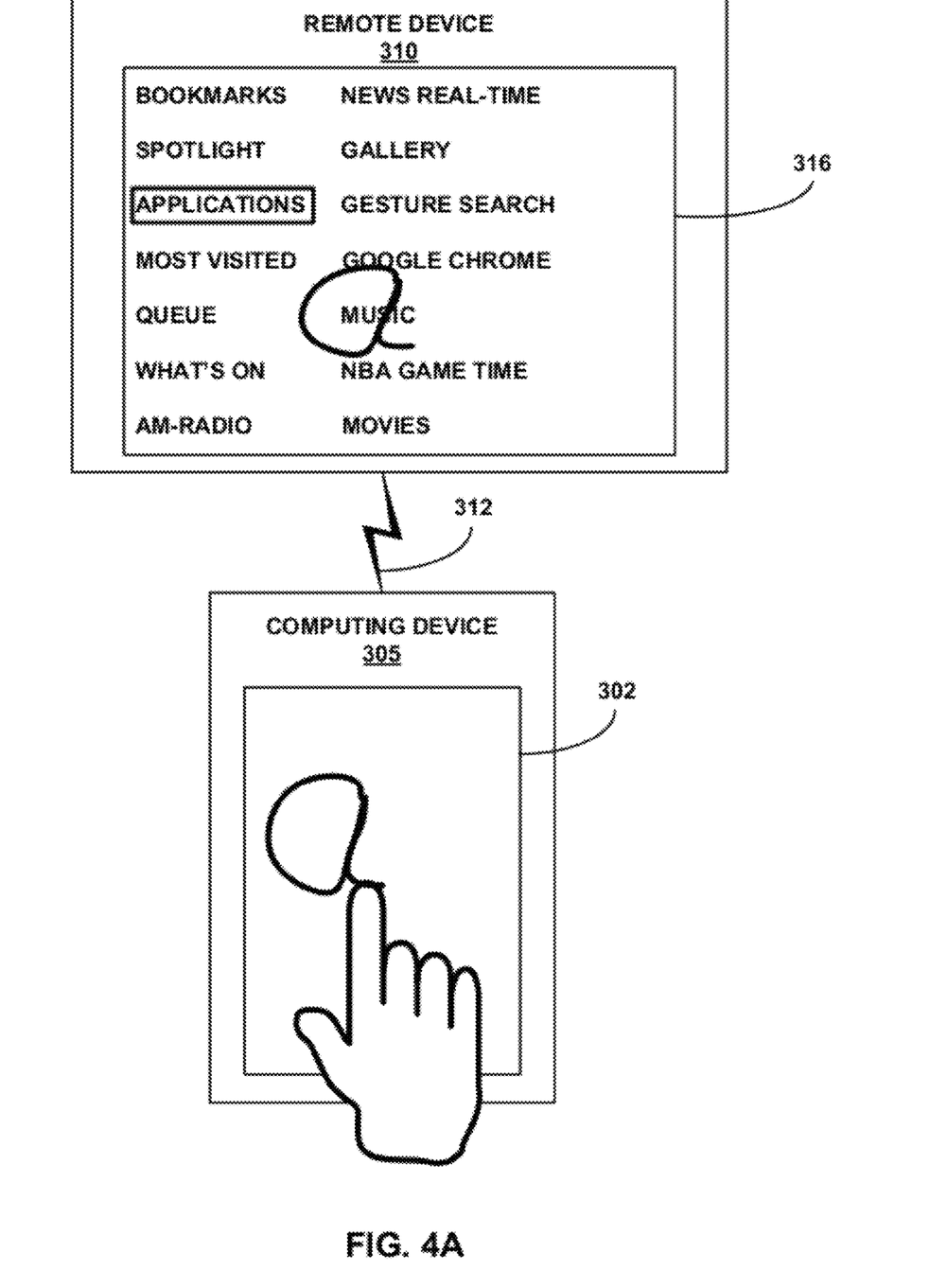
FIGS. 4A and 4B are block diagrams illustrating other example screen displays of a first computing device as a user interacts with the first computing device to remotely control a second computing device, in accordance with one or more aspects of the present disclosure.
Figure 4B:
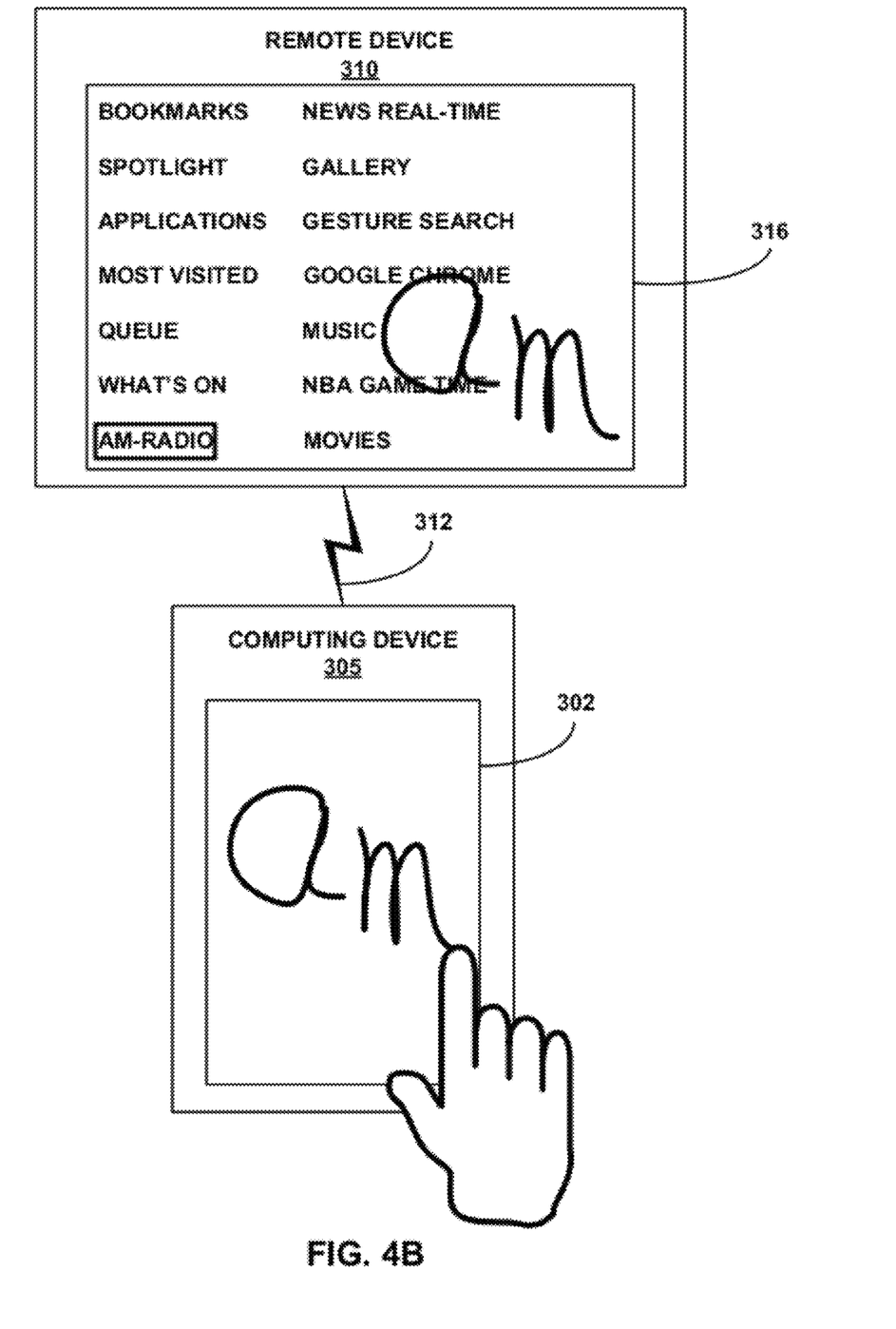

FIGS. 4A and 4B are block diagrams illustrating other example screen displays of a computing device as a user interacts with the computing device to remotely control a second computing device, in accordance with one or more aspects of the present disclosure. In some examples, as FIG. 4A illustrates, more than one target element may correspond to a drawn gesture. For example, the user may draw the gesture as shown in FIG. 4A, which may correspond to the letter "A." In this example, second computing device 310 may cause the first target element starting with the letter "A" to be highlighted, which is "Applications." If the highlighted target element is the one the user desired to select, the user may activate the highlighted target element as described above.

In one example, the user may have intended to select the target element "AM-Radio." In this example, the user may draw another gesture to indicate the desired target element. As FIG. 4B illustrates, the user may draw the gesture corresponding to the letter "M" to add it to the sequence of characters. In this example, second computing device 310 may determine the corresponding target element by associating the characters corresponding to the drawn gestures in the order they are drawn, and therefore, associating "AM-Radio" with the drawn gestures. As the user draws more gestures, the highlighted target element is updated accordingly, as FIG. 4B illustrates, where the word "AM-Radio" is highlighted. The user may then activate the highlighted target element as described above.

In one example, if the user makes a mistake and wishes to delete one or more of the gestures already drawn, the user may utilize gestures to delete drawn gestures. For example, the user may swipe horizontally leftward on user interface 302 to delete the last drawn gesture (e.g., "M"), and may swipe horizontally rightward on user interface 302 to delete the entire gesture sequence (e.g., "AM"). As the user deletes one or more drawn gestures, the highlighted target element may be updated accordingly. For example, if the user in the example of FIG. 4B deleted the gesture corresponding to the letter "M," second computing device 310 may updated the highlighted target element back to "Applications." If the user deletes the entire sequence of gestures drawn, no target element will be highlighted.

In one example, the user may wish to move the highlighted target element without having to draw a gesture on user interface 302. The user may utilize motion gestures to move the highlighting from one target element to another, where the motions may be up, down, left, or right, for example. In the example of FIG. 4B, the user may wish to select the target element "Queue." The user may move computing device 305 in an upward motion, resulting in moving the highlighting box up from "AM-Radio" until the desired target element, e.g., "Queue," is highlighted.

Figure 5:
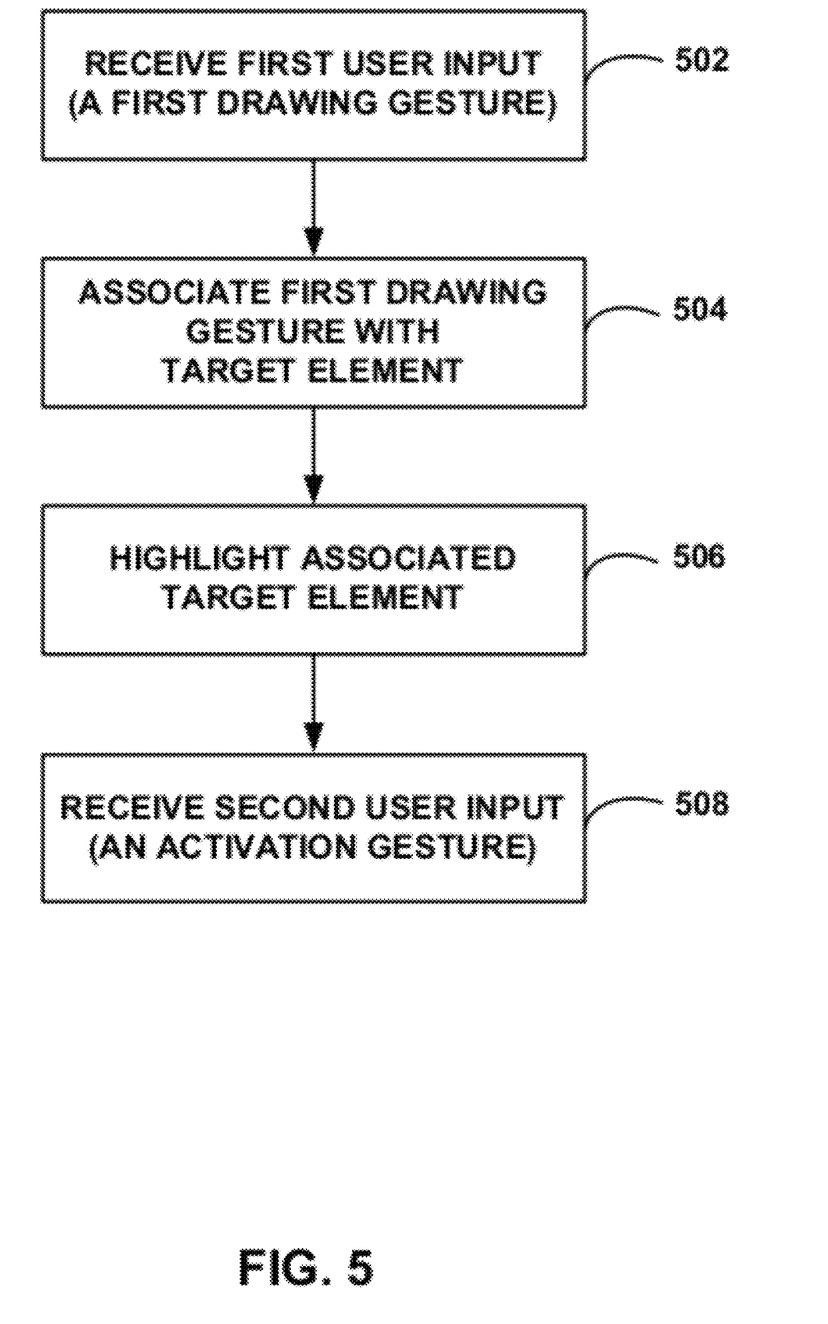
FIG. 5 is a flow diagram illustrating a method that may be performed by a computing device in accordance with one or more aspects of the present disclosure.

FIG. 5 is a flow diagram illustrating a method that may be performed by a computing device in accordance with one or more aspects of the present disclosure. For example, the illustrated example method may be performed, at least in part, by first computing device 105 (FIGS. 1 and 2). In some examples, a computer-readable storage medium (e.g., a medium included in storage device 128 of FIG. 2) may be encoded with instructions that, when executed, cause one or more processors (e.g., processor 122) to perform one or more of the acts illustrated in the method of FIGS. 1 and 2.

The method of FIG. 5 includes receiving, using a presence-sensitive user interface device (e.g., touch screen 102) coupled to the first computing device, first user input comprising a first drawing gesture (502). As noted above, the first drawing gesture may define a first characteristic associated with one or more target elements or items displayed on a display device associated with a second computing device (e.g., second computing device 110). The first characteristic may be a first letter of the one or more target element or a shape associated with the one or more target element. The first drawing gesture may be associated with at least one of the target elements based on the first characteristic, where the association may be performed by the first computing device and/or the second computing device (504). When an element or item displayed on the second computing device is associated with the drawing gesture, the element or item may be graphically highlighted to indicate the associated element or item (506).

The method also includes receiving, using the presence-sensitive user interface device, a second user input comprising an activation gesture (508). In response to receiving the activation gesture, the highlighted target element or item may be activated. In one example, activation may result in an operation associated with the highlighted target element or item, such as, changing the channel or manipulating a volume or display setting, for example. In another example, activation may result in displaying a subset of elements or items associated with the highlighted target element or item, such as, a submenu, for example. When activation results in displaying a subset of elements, the same method as described above may be utilized to select an element or menu of the subset of elements.

In one example, one or more elements or items may correspond to the first drawing gesture defining a characteristic associated with a target element or item. According to techniques of this disclosure, the highlighted target element or item may be the first listed element or item, or the one closest to the top of the menu or list of elements or items. In one example, the user may provide one or more additional drawing gestures corresponding to one or more additional characteristics associated with the target element or item. As the user inputs more drawing gestures, the associated target element or item may be updated and highlighted accordingly. In another example, if the highlighted element or item is not the desired one, the user may utilize directional gesture (e.g., by drawing gesturing in certain directions or by moving the first computing device) to move the highlighting from one element or item to another. In another example, if the highlighted element or item is not the desired one, the user may utilize drawing gestures to delete previously-drawn gestures, as described above.

Figure 6:
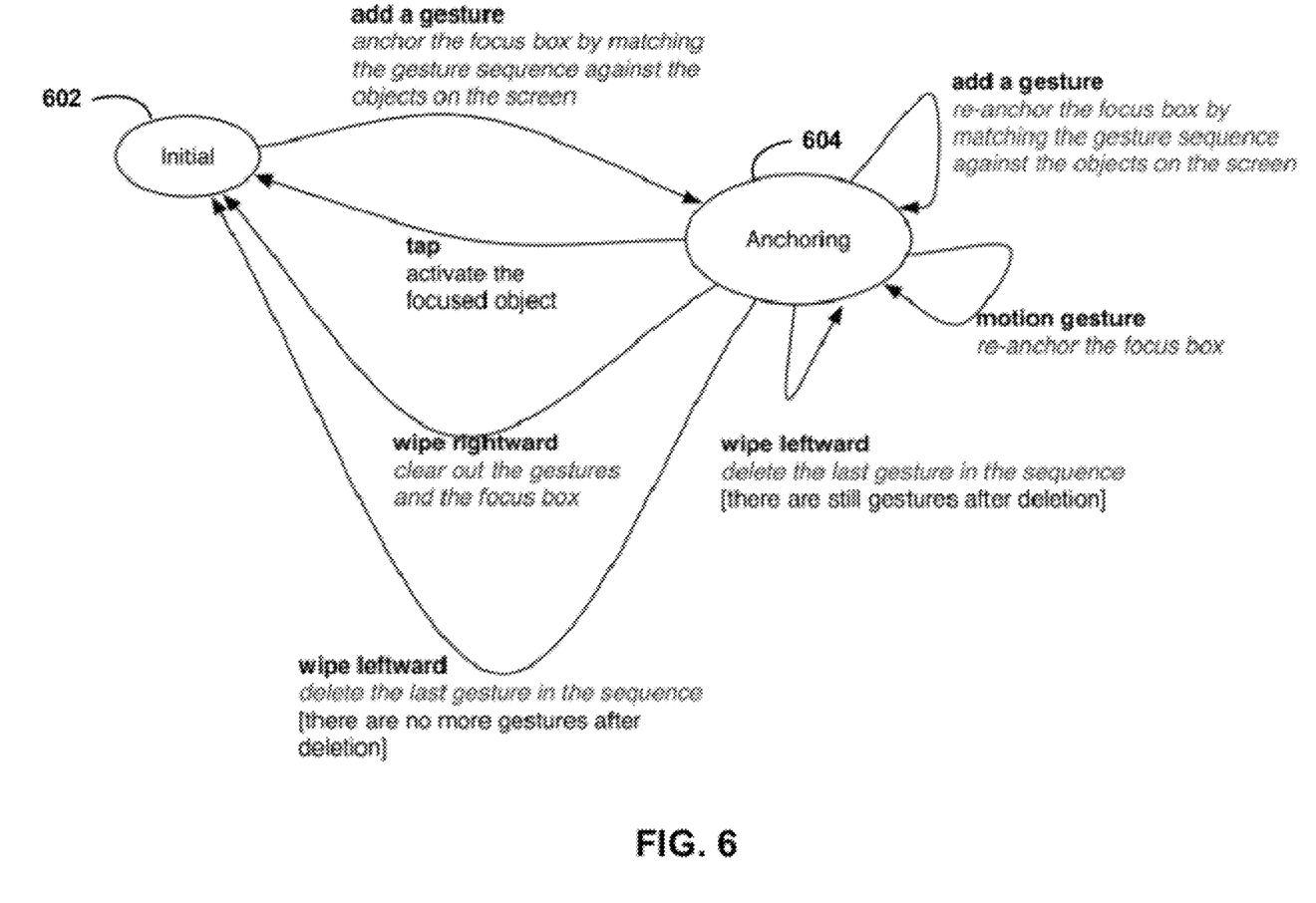
FIG. 6 is a state diagram illustrating example state transition functionality associated with one or more aspects of the present disclosure.

FIG. 6 is a state diagram illustrating example state transition functionality associated with one or more aspects of the present disclosure. As FIG. 6 illustrates there can be two states associated with the techniques of this disclosure: initial 602 and anchoring 604. During initial state 602, the user has not yet drawn any gestures on a user interface of a first computing device (e.g., first computing device 105 of FIGS. 1 and 2, or first computing device 305 of FIGS. 3 and 4). When a user adds a gesture by drawing it on the user interface of the first computing device, the drawn gesture is interpreted to determine the corresponding character. A second computing device with which the first computing device is communicating may associate the character with a target element displayed on a display device associated with the second computing device. The associated target element may be highlighted using, for example, a focus box, as described above. When the target element is highlighted, the associated state is anchoring 604, which indicates that a gesture has been drawn and the corresponding character has been associated with a target element.

While at the anchoring state 604, several actions can occur. For example, the user may draw another gesture corresponding to a second character, and the highlighted target element is updated accordingly such that the sequence of characters associated with the target element corresponds to the sequence of drawn gestures. In another example, from anchoring state 604, the user may utilize a motion gesture to change the highlighted target element by moving the highlighting from one target element to another. In this example, the user may move the highlighting from one element to another without having to draw additional or new gestures. In another example, from the anchoring state 604, the user may utilize a gesture to delete the last drawn gesture, when there is more than one drawn gesture. Deleting the last drawn gesture may change the corresponding sequence of characters and resulting in the highlighted target element to change to the target element corresponding to the remaining drawn gestures.

From the anchoring state 604, the user may perform some actions that may result in returning to the initial state 602. For example, the user may activate the highlighted target element by using a gesture indicating activation, e.g., tapping on the user interface of the first computing device. Activating the highlighted target element may result in displaying a new list of target elements associated with the highlighted target element or performing an operation associated with the highlighted target element, for example. The user interface of the first computing device may then be cleared and the user may start drawing gestures again to perform operations or select a target element associated with the updated display.

In one example, from anchoring state 604, the user may swipe rightward to delete the entire sequence of gestures drawn, thus clearing all the gestures, which may result in removing the highlighting from a highlighted target element, and the user may start over from a clear user interface. In another example, if the user had only drawn one gesture, a leftward swipe on the user interface of the computing device may result in clearing the only drawn gesture and therefore, removing highlighting from a highlighted target element and returning to the initial state 602 with a clear user interface.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, a computer-readable storage medium may comprise a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the disclosure have been described. These and other embodiments are within the scope of the following claims.

The invention claimed is:
1. A method comprising:
receiving, at a first device, via a presence-sensitive display of the first device, a first user input comprising a first drawing gesture, the first drawing gesture representing a drawing corresponding to a first character;
transmitting, by the first device to a second device wirelessly coupled to the first device, first data representing the first drawing gesture, wherein the second device includes a display displaying one or more selectable elements, and wherein at least a first one of the selectable elements includes the first character and is visually indicated on the display of the second device based upon the first data;
receiving, at the first device, via the presence-sensitive display, a second user input comprising a second drawing gesture, the second drawing gesture representing a drawing corresponding to a second character;
transmitting, by the first device to the second device, second data representing the second drawing gesture, wherein the at least a second one of the selectable elements includes both the first character and the second character and is visually indicated on the display of the second device based upon the second data;
after transmitting the second data, receiving, at the first device, via the presence-sensitive display, a third user input comprising a motion gesture; and
transmitting, by the first device to the second device, third data representing the motion gesture, wherein at least a third one of the selectable elements includes the first character and is visually indicated on the display of the second device based upon the third data.

2. The method of claim 1, wherein the display of the second device outputs a representation of the first drawing gesture based on the first data.

3. The method of claim 1, further comprising:
receiving, at the first device, via the first device, a second motion gesture that defines a direction of movement;
transmitting, by the first device to the second device, motion data representing the second motion gesture, wherein at least a fourth one of the selectable elements is visually indicated on the display of the second device based upon the motion data representing the second motion gesture, according to a defined direction relative to the at least third one of the selectable elements.

4. The method of claim 1, further comprising:
receiving, at the first device, via the presence-sensitive display of the first device, a fourth user input comprising a selection gesture; and
transmitting, by the first device to the second device, fourth data representing the selection gesture, wherein the at least third one of the selectable elements is selected in response to the fourth data,
wherein the display of the second device outputs a new list of one or more selectable elements in response to the fourth data.

5. The method of claim 1, further comprising:
receiving, via the presence-sensitive display of the first device, a fourth user input comprising a selection gesture; and
transmitting, by the first device to the second device, fourth data representing the selection gesture, wherein the at least the third one of the selectable elements is selected in response to the fourth data,
wherein an operation associated with the at least the third one of the selectable elements is executed by the second device in response to the fourth data.

6. The method of claim 1, wherein the one or more selectable elements comprises at least one of: one or more words, one or more graphical user interface elements, or one or more operations of the second device.

7. The method of claim 1, wherein the first data comprises data indicative of the first drawing gesture, and wherein the second device determines the first character based on the first data.

8. The method of claim 1, further comprising determining, by the first device, the first character based on the first drawing gesture, wherein the first data comprises the first character.

9. A computer-readable storage medium encoded with instructions that, when executed, cause one or more processors of a first device to perform operations comprising:
receiving, at a first device, via a presence-sensitive display of the first device, a first user input comprising a first drawing gesture, the first drawing gesture representing a drawing corresponding to a first character;
transmitting, by the first device to a second device wirelessly coupled to the first device, first data representing the first drawing gesture, wherein the second device includes a display outputting one or more selectable elements, and wherein at least a first one of the selectable elements includes the first character and is visually indicated on the display of the second device based upon the first data;
receiving, at the first device, via the presence-sensitive display of the first device, a second user input comprising a second drawing gesture, the second drawing gesture representing a drawing representing to a second character; and
transmitting, by the first device to the second device, data representing the second drawing gesture, wherein at least one of a second of the selectable elements includes both the first character and the second character and is visually indicated on the display of the second device based upon the second data;
after transmitting the second data, receiving, at the first device, via the presence-sensitive display of the first device, a third user input comprising a motion gesture; and
transmitting, by the first device to the second device, third data representing the motion gesture, wherein at least a third one of the selectable elements includes the first character and is visually indicated on the display of the second device based upon the third data.

10. The computer-readable storage medium of claim 9, wherein the display of the second device outputs a representation of the first drawing gesture based on the first data.

11. A first device, comprising:
one or more processors;
a presence-sensitive display;
a gesture module operable by the one or more processors to receive, via the presence-sensitive device, a first user input comprising a first drawing gesture and a second user input comprising a second drawing gesture, wherein the first drawing gesture represents a drawing corresponding to a first character, and wherein the second drawing gesture represents a drawing corresponding to a second character;
a network interface configured to transmit, to a second device wirelessly coupled to the first device, first data representing the first drawing gesture, wherein the second device includes a display outputting one or more selectable elements, and wherein at least a first one of the selectable elements includes the first character and is visually indicated on the display of the second device based upon the first data;
the network interface being further configured to transmit second data representing the second drawing gesture to the second device wirelessly coupled to the first device, wherein at least a second one of the selectable elements includes both the first character and the second character and is visually indicated on the display of the second device based upon the second data;
a user interface controller operable by the one or more processors to receive, via the presence-sensitive user interface device, a third user input comprising a motion gesture; and
the network interface being further configured to transmit third data representing the motion gesture to the second device, wherein at least a third one of the selectable elements includes the first character and is visually indicated on the display of the second device based upon the third data.

12. A system comprising:
a first device comprising:
a presence-sensitive display configured to receive a user input;
a network interface configured to transmit data; and
a second device coupled to the first device, the second device comprising a display configured to output one or more selectable elements;
wherein the presence-sensitive display receives a first user input comprising a first drawing gesture, the first drawing gesture representing a drawing corresponding to a first character, wherein the network interface transmits to the second device first data representing the first drawing gesture, wherein at least a first one of the selectable elements includes the first character is visually indicated on the display of the second device based upon the first data, wherein the presence-sensitive user interface device receives a second user input comprising a second drawing gesture, the second drawing gesture representing a drawing corresponding to a second character, wherein the network interface transmits, to the second device, second data representing the second drawing gesture, wherein at least a second one of the selectable elements includes both the first character and the second character and is selected in response to visually indicated on the display of the second device based upon the second data, wherein after the second data is transmitted, the presence-sensitive display receives a third user input comprising a motion gesture wherein the network interface transmits to the second device third data representing the motion gesture, and wherein a third at least one of the selectable elements includes the first character and is visually indicated on the display of the second device based upon the third data.

* * * * *